D. Williams.
Tailors' Measure.
RX 11
No 11.. Reissued Aug. 31. 1839.
7591X Related Doc.
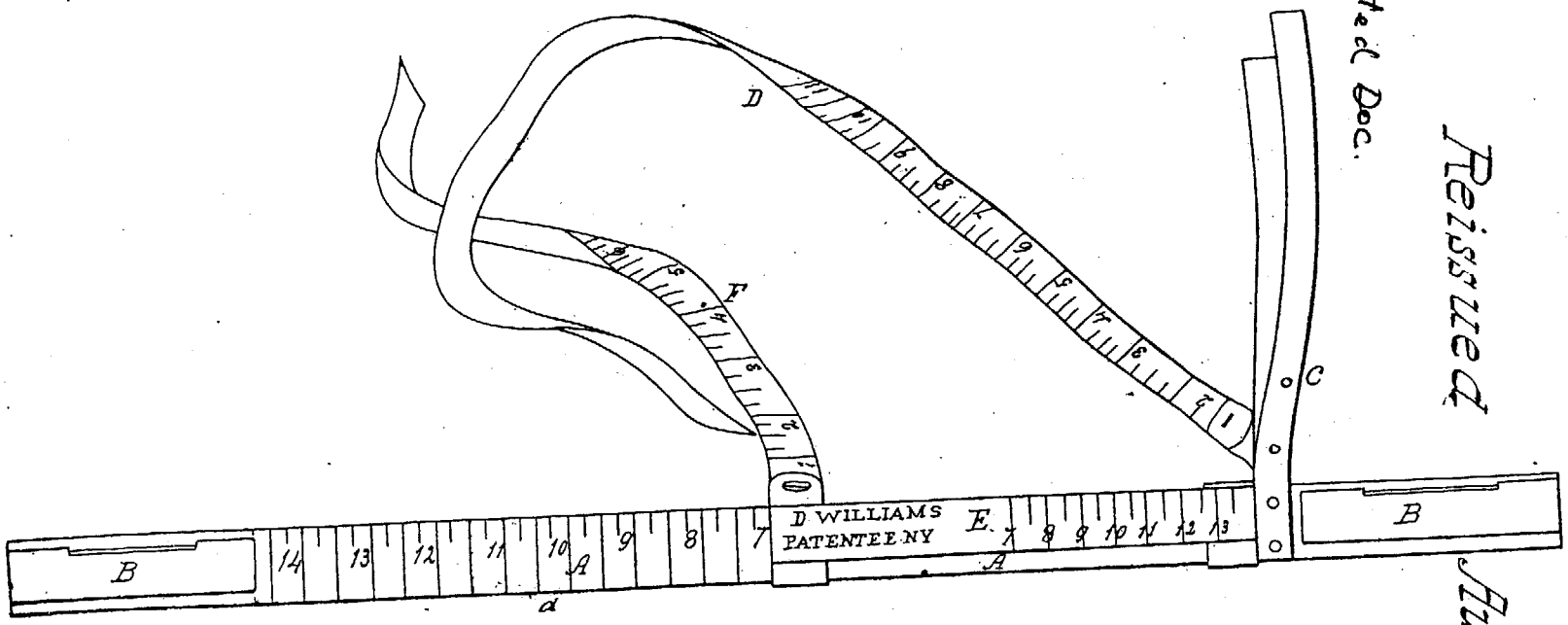

Rx 11

UNITED STATES PATENT OFFICE.

DANIEL WILLIAMS, OF NEW YORK, N. Y.

IMPROVEMENT IN THE ART OF TAILORING.

Related Doc 7591 X

Specification forming part of Letters Patent dated May 22, 1833; Reissue No. 11, dated August 31, 1839.

*To all whom it may concern:*

Be it known that I, DANIEL WILLIAMS, of the city, county, and State of New York, have invented a new and useful Machine and Improvement in the Art of Tailoring, called the "Mathematical Measurer;" and I do hereby declare that the following is a full and exact description of the construction and operation of the said machine as invented by me.

First, I take a piece of spring-steel or other metal about twenty-one inches long (more or less) and about one inch and a quarter wide, of which I form a strap, A A; second, to each end of this strap I attach a spirit-level, B B, placed in a small block of mahogany or other wood, for the purpose of adjusting the instrument when it is in use in a line exactly parallel with the horizon; third, a stem or upright piece of metal, C, is attached to the strap near the right-hand end and at right angles with its upper edge, to which, near the angle, is fastened a tape-measure, D, not less than eighteen inches long; fourth, the first-described piece of metal or strap A A is divided into inches and half inches, commencing at the upright stem and proceeding to the left; fifth, a piece of brass, E, about seven inches long, divided into half and quarter inches, (the inches commencing on the left and proceeding to the right,) is made to slide on the steel strap by means of a brass band at each end. To the zero end of this sliding brass is attached a tape-measure, F, not less than two inches long.

The following is the mode of using the machine:

First. Place the strap close under the right arm with the upright stem close in front of it, taking great care that the coat on the customer be not in doubles under or in front of the arm, so as to prevent the machine from going close to the body.

Second. Adjust the level or the right-hand end of the strap so that the bubble passes from end to end, and let the customer place the thumb of his right hand on it to keep it in this position against the body.

Third. Place the right hand under the lower edge of the strap and directly under the right arm, with which the strap is kept tight up to the arm, and it is not to be removed until the level is adjusted on the other end of the steel, and the five following measures are taken, which must be done with the left hand:

1. Slide the brass or the strap so that the left-hand end of it shall touch the back-seam of the coat on the customer, and the number of inches it reaches on the strap is to be entered in the measure-book. This we shall call the "cardinal measure."

2. The tape-measure on the front end of the strap is to be passed up the shoulder to the prominent bone on the back part of the neck and place the number of inches in the measure-book. This we shall call the "neck-measure."

3. Pass now the tape-measure over the shoulder close to the sleeve-head and down to the strap at the same figure on the brass that was taken from the strap when the first or cardinal measure was taken, or, in other words, the same as the figure on the strap which the end of the brass still touches. This we shall call the "shoulder-measure."

4. The short tape-measure attached to the brass is to be passed up the back-seam to the bone before mentioned at the back of the neck. This we shall call the "level-measure."

5. Pass the measure first used across the breast to the front of the left arm. This we shall call the "breast-measure."

Fourth. Take the level on the right-hand end of the steel in the right hand and hold it firmly against the breast of the customer, with the bubble floating, the upper edge of the steel being close under the arm, and the upright piece close to the front of it, as before. The measure fastened to the steel stem will now be taken and passed upon a straight line with the edge of it, holding it a little distance from the steel. Now, the question is, where is the upper point of the fore part of the coat in relation to this line carried up in front of the arm? Is it in front of the line or back of it? or is it on a straight line with it? Whichever it is must be noted in your measure-book, judging of the quantity as near as possible if it be either in front or back of the line.

I claim as my invention the combination of the several parts constituting the machine herein described, viz:

RX

1. The combination of the spirit-levels with the graduated metallic strap, in the manner and for the purposes herein set forth.

2. The combination of the graduated metallic strap, having a spirit-level at one or both ends, with the upright stem having a tape-measure at or near the angle of junction.

3. In combination with the above, the metallic slide having a tape-measure attached to it at the point described, the whole being constructed and operating in the manner and for the purpose herein specified.

DANIEL WILLIAMS. [L. S.]

Witnesses:

HENRY CLARK,

E. P. WHIPPLE.